Dec. 7, 1954 T. R. HARRISON 2,696,117
RADIATION PYROMETER
Filed June 24, 1950 2 Sheets-Sheet 1

INVENTOR.
THOMAS R. HARRISON
BY Arthur H. Swanson
ATTORNEY.

Dec. 7, 1954  T. R. HARRISON  2,696,117
RADIATION PYROMETER
Filed June 24, 1950  2 Sheets-Sheet 2

INVENTOR.
THOMAS R. HARRISON
BY
Arthur H. Swanson
ATTORNEY.

United States Patent Office 2,696,117
Patented Dec. 7, 1954

2,696,117

RADIATION PYROMETER

Thomas R. Harrison, Wyncote, Pa., assignor to Minneapolis-Honeywell Regulator Company, Minneapolis, Minn., a corporation of Delaware Application June 24, 1950, Serial No. 170,200

18 Claims. (Cl. 73—355)

A general object of the present invention is to provide an improved method of and means for compensating a radiation pyrometer of the thermoelectric type for ambient temperature variations.

In my prior Patent 2,357,193, I have disclosed a radiation pyrometer of the type comprising a relatively massive metallic housing body, a receiver in the form of a thermopile mounted in said body, and a lens also mounted in said body for transmitting heat rays to the receiver from a source of radiant heat to be measured. With the receiver of such a pyrometer operative to absorb all radiant energy transmitted to it, the receiver will develop an electromotive force (E. M. F.), the value of which can be expressed by the equation $$E = M(Ts^4 - Tb^4)$$

In the foregoing equation, E is the E. M. F. developed by the thermopile, $Tb$ is the absolute temperature of the body of the pyrometer, $Ts$ is the absolute temperature of a black body source of a temperature to be measured, and M is a multiplier, which normally decreases in value as the pyrometer body temperature $Tb$ increases.

The calibration of such a pyrometer is dependent in part upon the value of $Tb^4$, as appears from the bracketed portion of the equation, and is also dependent in part upon the value of $Tb$, as the latter affects the value of M. Complete compensation for the two effects upon the measurement values of variations in $Tb^4$ and $Tb$ requires an additive factor which corrects for the variations in the temperature $Tb^4$, and a variable multiplying factor dependent upon $Tb$ to prevent M from undergoing variations as the temperature $Tb$ varies; i. e., to maintain M constant.

As is explained in said prior patent, a pyrometer may be so constructed that a shunt across the thermopile, having a resistance which varies with the pyrometer body temperature $Tb$, can make the proper corrections in the multiplying factor M, so that the same pyrometer calibration may apply for a large range of source temperatures $Ts$ to be measured with a relatively wide range of values of the pyrometer body temperature $Tb$. As was explained in my prior patent, such a shunt resistor, or other structural arrangement, can provide proper ambient temperature compensation when the ratio of the excess of the hot junction temperature of the thermopile over the cold junction temperature for one housing temperature to that excess for another housing temperature is constant for all values of the source temperature $Ts$ to be measured. This condition can be satisfied for source temperatures $Ts$ above some minimum value, indicated by the upper horizontal part of a curve shown in Fig. 5 of said patent and labeled $Q=3 \times 10^{10}$. The term $Tb^4$ is then practically insignificant in relation to the term $Ts^4$ so that no additive correction is required for normal variations in the temperature $Tb$.

A primary object of the present invention is to provide in a radiation pyrometer simple and effective means for obtaining the additional additive compensation needed to correct for variations in the value of $Tb^4$ in potential measurements, under the condition in which the source temperature $Ts$ is so relatively low that the term $Tb^4$ becomes an imporant element in the expression $(Ts^4 - Tb^4)$. Such source temperatures, for example, include temperatures down to, or below, ordinary room temperatures.

In the practice of the preferred forms of the present invention, I obtain adequate compensation for variations in pyrometer body temperatures through a range including an upper portion in which the compensating effect of the shunt resistor or other structural arrangement described in my prior patent provides adequate compensation, and a lower portion in which the supplemental effect of an additive correction for variations in the value of the temperature $Tb$ is highly desirable, by connecting the pyrometer disclosed in my prior patent, with its compensating arrangement, to a potentiometric measuring circuit network including one or more temperature responsive resistors through which the needed additive correction is obtained.

More specifically, I may advantageously obtain the needed additive compensating effect by including a temperature responsive resistor in one branch of a potentiometric measuring circuit comprising a second branch which includes a slidewire resistor, and also comprising a detector branch which includes the thermopile and which is connected between a slider contact engaging the slidewire resistor and the circuit branch including the temperature responsive resistor.

In another desirable form of the invention, I connect the thermopile and its shunt resistor to a potentiometer circuit branch including a temperature responsive bridge resistor by means of a thermocouple circuit arranged to compensate precisely for the thermopile output voltage error tending to result from changes in the factor $Tb^4$ in the term $(Ts^4 - Tb^4)$.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Figure 1:
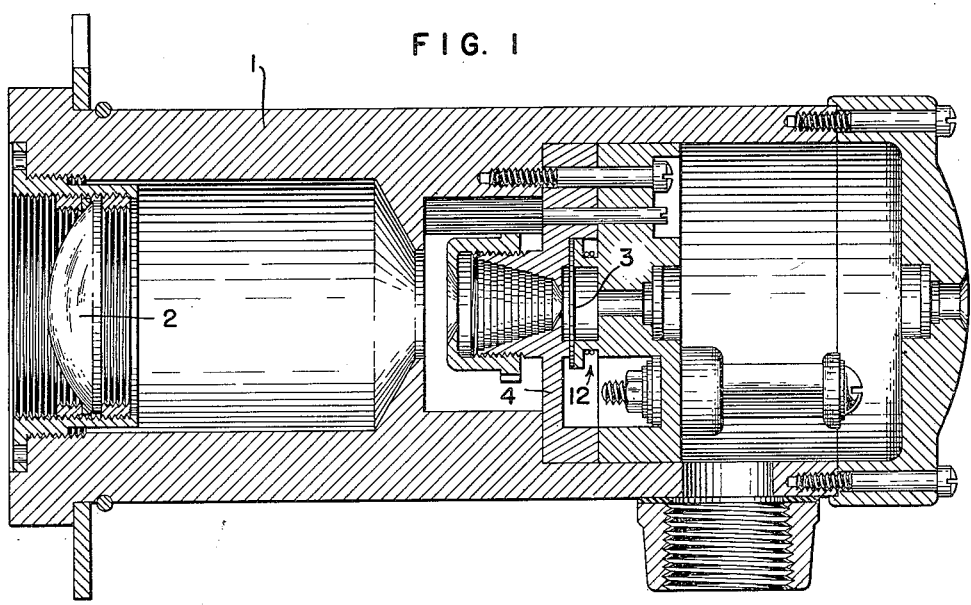
Fig. 1 is a sectional elevation of a radiation pyrometer.
Figure 2:
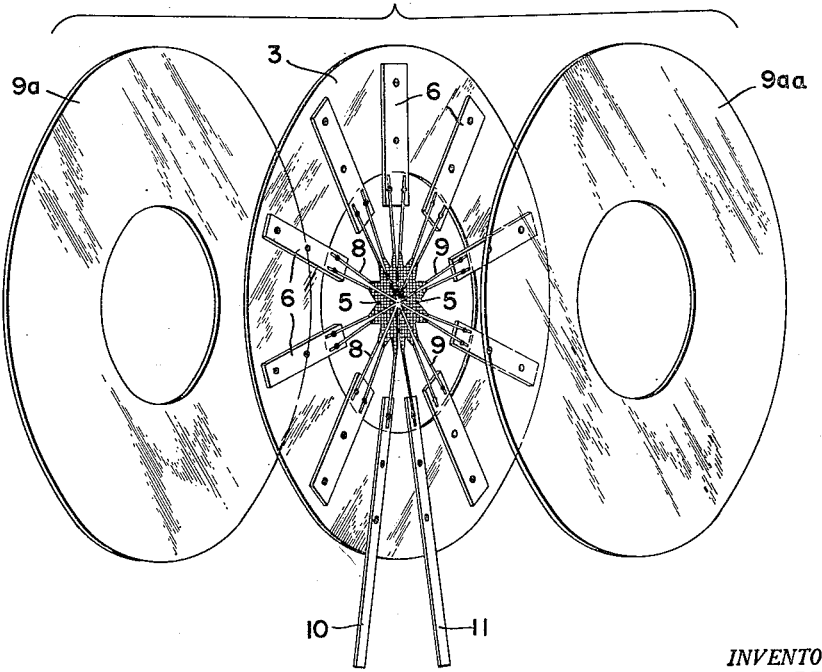
Fig. 2 is an enlarged perspective view of the thermopile shown in Fig. 1.

In Fig. 1, I have illustrated a radiation pyrometer of the general type and form disclosed in my prior Patent 2,357,193. The pyrometer shown in Fig. 1 comprises a relatively massive metallic pyrometer housing or shell 1 having a lens system 2 mounted in one end for transmitting heat rays to a thermopile 3. The latter extends transversely across the axis of the pyrometer housing and is directly mounted in a thermopile housing structure 4 seated in said pyrometer housing. The thermopile is shown in detail in Fig. 2. It is a circular structure comprising a plurality of hot junctions 5 adjacent and distributed about the pyrometer axis, a plurality of cold junctions 6 arranged in a circle adjacent the periphery of the thermopile structure, and a pair of conductors 8 and 9 connected to each hot junction and collectively connecting the hot and cold junctions together in series, with the hot junctions alternating with the cold junctions between the thermopile terminals 10 and 11. As shown, the thermopile conductors are arranged between mica discs $9a$ and $9aa$. An annular channel 12 coaxial with the pyrometer housing is formed in the thermopile housing 4 and forms a winding space for one or more compensating resistors as hereinafter explained.

Figure 3:
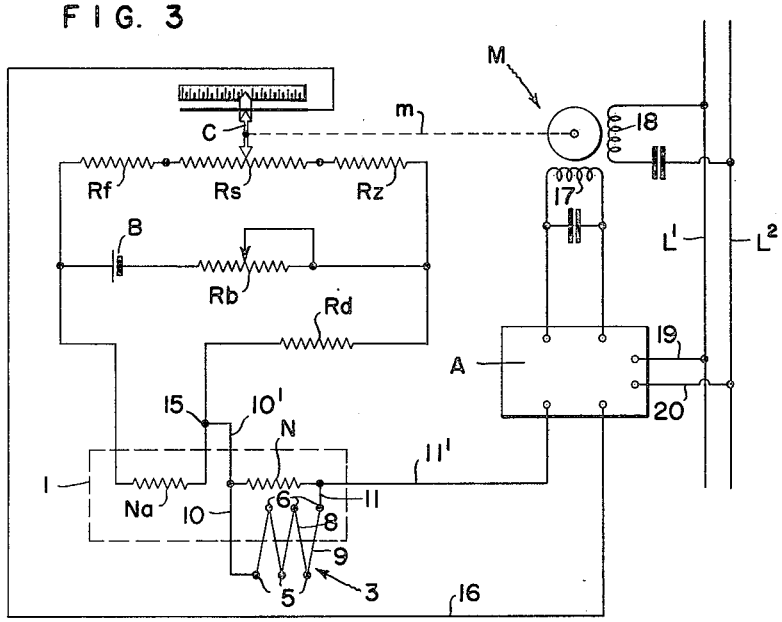
Fig. 3 is a diagram illustrating a measuring circuit arrangement.

The potentiometric measuring circuit shown in Fig. 3 comprises two branches connected in parallel with one another across a battery B and an adjustable resistor $Rb$ in series with the battery provided to permit standardization of the current in the well known manner. One of the branches comprises resistors $Rf$, $Rs$ and $Rz$ connected in series with one another, and the second branch includes resistors $Na$ and $Rd$ connected in series with one another. The resistor $Rs$ is a slidewire resistor engaged by a slider contact C adjustable along the length of the slidewire. The contact C is connected to a second circuit branch point 15 between the resistors $Na$ and $Rd$ by a detector circuit. The detector circuit includes a motor drive unit A and a thermopile 3 shunted between its terminals 10 and 11 by a resistor N. The input terminals of the motor drive unit A and thermopile 3 with its shunt resistor are connected in series between the contact C and circuit branch point 15 by conductors 16, 11′ and 10′.

With the circuit arrangement of Fig. 3, the thermopile shunt resistor N and bridge resistor Na are coils arranged side by side in the pyrometer housing channel 12 as seen in Fig. 1, so as to be maintained at the thermopile cold junction temperature. The resistors N and Na are temperature responsive resistors, each being made of a metal, usually nickel, having a positive temperature coefficient of resistance. By the expression "temperature responsive resistor" as used in this specification and in the appended claims, I mean a resistor formed of such metal that its resistance varies significantly in response to variations in its temperature.

In the normal balanced condition of the apparatus shown diagrammatically in Fig. 3, the adjustment of the slider contact C is such that there is no potential applied to the input terminals of the motor drive unit A. A change in the temperature measured creates a voltage difference between the contact C and the conductor 11′, and thereby actuates the motor drive unit A to effect the corrective adjustment of the slider contact C required to again reduce to zero the potential applied to the input terminals of the motor drive unit A.

As diagrammatically shown, the slider contact C is given rebalancing adjustments by a reversible alternating current motor M. The latter has a control winding 17 connected to and energized by the motor drive unit A, and has a power winding 18 connected across alternating current supply conductors L$^1$ and L$^2$. The unit A is shown as having energizing terminals 19 and 20 connected to the supply conductors L$^1$ and L$^2$. The unit A may well be of the well known and widely used type disclosed and claimed in the Wills Patent 2,423,540, of July 8, 1947. That unit comprises a vibrating converter for converting the direct current signal impressed on the unit A into an alternating current signal of the frequency of the voltage across the supply conductors L$^1$ and L$^2$, and of one phase or the opposite phase according to the direction of flow of the direct current signal, and also comprises amplifying means and a pair of electronic motor drive valve collectively energizing the control winding 17 to cause operation of the motor M in one direction or in the opposite direction dependent on the phase of the alternating current signal.

As the above stated equation makes apparent, when the temperature $Tb$ equals the temperature $Ts$, the electromotive force E is necessarily equal to zero, regardless of the actual value of the temperature $Ts$ and regardless of the value of the multiplier M. Thus, for example, a pyrometer having a body temperature of 300° K. and sighted upon a black body temperature source at 300° K. develops zero E. M. F., and a pyrometer at 400° K. sighted upon a black body source at 400° K. also develops zero E. M. F., so that zero E. M. F. is not identified definitely with any particular temperature. According to my invention, the calibration of the pyrometer may well be determined in some cases with the pyrometer body temperature $Tb$ at 300° K., and with the pyrometer provided with a resistor N arranged to provide proper compensation for measuring relatively high temperatures $Ts$ as described in my prior patent. The calibration should them be carried out through a range of source temperatures $Ts$ including the range of temperature within which the body temperature $Tb$ is expected to change. The calibration thus obtained, with the temperature $Tb$ held constant at the assumed value of 300° K., serves as the basis for determining the additive compensation necessary to correct for variations in the term $Tb^4$ in the expression $(Ts^4-Tb^4)$ when the values of the temperature $Ts$ are relatively low.

In accordance with the present invention, the additive compensator Na shown in Fig. 3 needs to be a source of corrective E. M. F. whose values vary with variations in the body temperature $Tb$ in accordance with the above mentioned calibration, within the range of the body temperatures $Tb$ to which the instrument is to be subjected. This source of the corrective E. M. F., in effect, is connected in series with the thermopile 3 in such manner that when the pyrometer is sighted upon a source at higher temperature than that of the pyrometer body, and the temperature of the latter is increased to approach the then existing temperature $Ts$ so that the value of the expression $(Ts^4-Tb^4)$ diminishes, the correction increases and is added to the E. M. F. of the thermopile. Thus, the sum of the two E. M. F.'s always equals the E. M. F. which would be developed by the thermopile, if the body temperature $Tb$ were kept constant at the assumed calibrating temperature of 300° K.

Thus, for example, in a certain uncompensated pyrometer having a body temperature $Tb$ of 300° K. and sighted upon a source at 400° K., the thermopile cold junctions would be at 300° K. and the hot junctions would be at 300.53° K. as shown in the fifteenth from the bottom line in column 2 of "Table I" of my above mentioned patent. The difference of 0.53° K. between hot junctions and cold junctions is the source of the E. M. F. developed by the thermopile. An increase in the temperature $Tb$ from 300° K. to 400° K. without change in the source temperature $Ts$ of 400° K. would cause the thermopile hot and cold junction temperatures to each increase to 400° K. The reduction in the difference between the hot and cold junction temperatures from 0.53° K. to zero is the change in temperature difference for which correction is needed and made by the additive corrector Na, and not the 100° change in cold junction temperature from 300° K. to 400° K.

The need for correction for variation in the multiplier M can be seen from the following consideration. If, with the radiation pyrometer body temperature $Tb$ at 400° K., the source temperature $Ts$ is reduced to 300° K., the hot junction temperature would become 0.48° K. cooler than the body temperature as contrasted with the 0.53° K., difference when the values of $Tb$ and $Ts$ were reversed as first stated. This case is listed in column 5, line sixteen from the bottom of the above mentioned hot and cold junction temperatures resulting from variations in the difference between the source and cold junction temperatures illustrates and explains the need for correction for variation in the multiplier M, as $Tb$ changes, which is obtained by the shunt resistor N herein, as such correction is obtained by a shunt resistor in my prior patent. Where the range of values of the source temperature $Ts$ and the body temperature $Tb$ are relatively narrow, the portion of the compensation provided by the shunt resistance N can be dispensed with. While the foregoing explanations have been based upon the assumption of a lens having perfect transmission for radiant energy, the same principles apply for other lenses.

Figure 4:
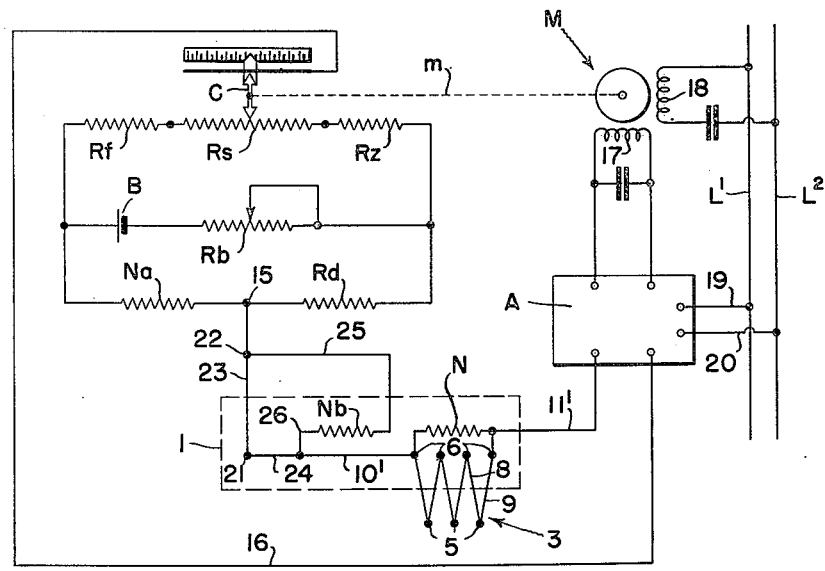
Fig. 4 is a diagram illustrating a modified measuring circuit arrangement.

The arrangement shown in Fig. 3 is devised and adapted for use with the resistor Na associated with the pyrometer housing so as to vary in temperature with the latter as by mounting it in the channel 12 or otherwise maintaining it in contact with the good heat conducting metal, such as aluminum, of which the pyrometer housing body is formed. The resistor Na can be used in obtaining the desired additive compensating effect, however, without maintaining that resistor at the pyrometer body temperature. For example, when the resistor Na is not maintained at the pyrometer body temperature $Tb$, the effect of the difference between the actual temperature of the resistor Na and the pyrometer body temperature may be compensated for by the use of a thermocouple having the proper temperature E. M. F. relation which is connected between the potentiometer circuit point 15 and the pyrometer terminal. Without the use of such a thermocouple, the same result may be obtained by the use of a thermocouple having a higher E. M. F. per degree of difference between its hot and cold junction terminals in combination with a suitable shunt reducing its E. M. F. to the required value, as illustrated in Fig. 4.

As previously stated, the need for the additive compensation obtained in Fig. 3 by the inclusion of the resistor Na with its positive temperature coefficient in the bridge circuit and by the maintenance of that resistor at the cold junction temperature, results from the presence of $Tb^4$ in the term $(Ts^4-Tb^4)$.

By proper selection of the values of resistors Na and Rf, this additive compensation can be made exact for two values of the housing body temperature $Tb$. The degree to which the compensation conforms to other values of the body temperature $Tb$ is dependent, inter alia, upon the extent to which the two selected values of $Tb$ are displaced from each other. Between those points, the compensation effect may or may not conform exactly to the required amount of compensation. As a practical matter, however, the compensating action obtainable with the arrangement shown in Fig. 3 is good enough to be practically satisfactory in ordinary uses of a radation pyrometer of the type described to measure relatively low source temperatures.

Instead of using a nickel resistor located at the pyrometer housing, this resistor may be located at the potentiometer instrument and the pyrometer housing temperature be brought into account by the use of a thermocouple having the proper temperature-E. M. F. relation.

In lieu of such a thermocouple, a thermocouple delivering a higher E. M. F. per degree, shunted to reduce its temperature-E. M. F. relation to the required value, can be employed. By making all or part of the shunt resistor of nickel wire, a rising temperature-E. M. F. characteristic can be obtained which is of the required form to compensate for the exponential characteristic introduced by the exponential character of the term $Tb^4$. This embodiment of my invention is illustrated in Fig. 4.

In Fig. 4, I have illustrated a form of my invention in which it is possible to obtain practically perfect compensation for the effect of the presence of $Tb^4$ in the term $(Ts^4 - Tb^4)$ throughout the measuring range. The arrangement shown in Fig. 4 has a further practical advantage over the arrangement shown in Fig. 3 in that the compensating resistor $Na$ included in the potentiometer bridge circuit does not need to be maintained at the pyrometer body temperature, but may vary with the measuring instrument ambient temperature. The apparatus shown in Fig. 4 may be, and is assumed to be, identical with the apparatus shown in Fig. 3, with two exceptions: namely, the Fig. 4 apparatus includes no means for maintaining the resistor $Na$ at the pyrometer body temperature. In Fig. 4, the thermopile terminal 10' is connected to the potentiometer bridge point 15 through a closed or loop thermocouple circuit. As shown, the circuit comprises a third temperature responsive resistor $Nb$, and a thermocouple 23, 25 having hot and cold junctions 21 and 22, respectively. The conductor 24, which may be formed of copper, connects the hot junction 21 to the conductor 10'. The thermoelement 23, which may be formed of constantan, connects the hot junction 21 to the cold junction 22, which is arranged to be at the same temperature as the resistor $Na$. The cold junction 22 is connected to the circuit branch point 15, and is also connected by a conductor 25, which may be of copper, to one terminal of the resistor $Nb$. The second terminal of the resistor $Nb$ is connected to the conductor 10'.

In the Fig. 4 form of the invention, the thermocouple hot junction 21 and the resistor $Nb$, as well as the shunt resistor N and the cold junctions of the thermopile, are subjected to the heat absorbing and temperature equalizing action of the housing 1. The thermocouple cold junction 22 and temperature responsive resistor $Na$ are not subject to the temperature of the pyrometer housing 1, but are free to vary with the ambient temperature, external to the pyrometer housing, to which they are exposed.

If it be assumed that $rs$ represents the resistance of the nickel resistor $Nb$ and the conductor 25, that $rc$ represents the resistance of the conductors 23 and 24, that E represents the thermocouple voltage, and that $e$ represents the compensating voltage produced across the resistor $Nb$, the compensating voltage can then be computed from the following equation $$e = E \frac{rs}{rc + rs}$$

From this equation, it is apparent that when $rs$ increases with the increases in the pyrometer body temperature, the quotient $$\frac{rs}{rc + rs}$$

will also increase. Thus, the increase in pyrometer body temperature not only will produce an increase in the output votage of the compensating thermocouple, but will also increase the fraction of the output voltage which appears across the resistor $Nb$. This further beneficial compensating action is most effective where the compensatnig resistor $Na$ and cold junction 22 are substantially constant in temperature.

In this manner, the compensating voltage appearing across the resistor $Nb$ can be made to have a rising characteristic conforming more nearly to the rising characteristic of $Tb^4$ in the term $(Ts^4 - Tb^4)$. Thus, the arrangement shown in Fig. 4 makes it theoretically possible to obtain more precise compensation. While such precise compensation is theoretically not obtainable with the form of the invention shown in Fig. 3, the somewhat simpler arrangement shown in Fig. 3 provides compensation which is practically adequate for many uses of the apparatus.

While, in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. A radiation sensitive instrument including a temperature equalizing structure, an electrical effect-producing radiation sensitive element having a part arranged within said structure to receive radiant heat from a source of such heat, having a reference part arranged in close thermal contact with said structure, and adapted to produce an electrical effect dependent upon the difference between the temperatures of said parts, an electrical measuring circuit having a pair of output terminals and including said element between said terminals, a first temperature sensitive compensating means having at least a portion electrically connected in circuit with said element between said terminals and having at least a portion arranged in close thermal contact with said structure and electrically responsive to the temperature thereof, said first compensating means being adapted, in response to change in the temperature of said structure from a predetermined low value to a higher value, to introduce between said terminals in additive relation to said electrical effect a first compensating electrical effect which is dependent upon the temperature of said structure and which is substantially equal to the electrical effect which would be produced by said element when said structure is at said predetermined low temperature and said radiation receiving part is exposed to radiation from a source at said higher temperature, and a second temperature sensitive compensating means electrically connected in circuit with said element and said connected portion of said first compensating means between said terminals and responsive to the temperature of said structure, said second compensating means being adapted to introduce between said terminals a second compensating electrical effect dependent upon the temperature of said structure and effectively modifying the sensitivity of said element in accordance with changes in the last mentioned temperature.

2. A radiation sensitive instrument including a temperature equalizing structure, an electrical effect-producing radiation sensitive element having a part arranged within said structure to receive radiant heat from a source of such heat, having a reference part thermally associated with said structure, and adapted to produce an electrical effect dependent upon the difference between the temperatures of said parts, an electrical measuring circuit having a pair of output terminals and including said element between said terminals, a first temperature sensitive compensating means having at least a portion electrically connected in circuit with said element between said terminals and having at least a portion arranged in close thermal contact with said structure and electrically responsive to the temperature thereof, said first compensating means being adapted, in response to change in the temperature of said structure from a predetermined low value to a higher value, to introduce between said terminals in additive relation to said electrical effect a first compensating electrical effect which is dependent upon the temperature of said structure and which is substantially equal to the electrical effect which would be produced by said element when said structure is at said predetermined low temperature and said radiation receiving part is exposed to radiation from a source at said higher temperature, and a second temperature sensitive compensating means electrically connected in circuit with said element and said connected portion of said first compensating means between said terminals and responsive to the temperature of said structure, said second compensating means being adapted to introduce between said terminals a second compensating electrical effect dependent upon the temperature of said structure and effectively modifying the sensitivity of said element in accordance with changes in the last mentioned temperature.

3. In a radiation pyrometer of the thermoelectric type including a temperature equalizing structure, a thermoelectric element having a measuring junction arranged within said structure to receive radiant heat from a source of such heat, having a reference junction thermally associated with said structure, and adapted to produce an electrical effect dependent upon the difference between the temperatures of said junctions, an electrical measuring circuit having a pair of output terminals and including said element between said terminals, a first temperature sensitive compensating means having at least a portion electrically connected in circuit with said element between said terminals and having at least a portion arranged in close thermal contact with said structure and electrically responsive to the temperature thereof, said first compensating means being adapted, in response to change in the temperature of said structure from a predetermined low value to a higher value, to introduce between said terminals in additive relation to said electrical effect a first compensating electrical effect which is dependent upon the temperature of said structure and which is substantially equal to the electrical effect which would be developed by said element when said structure is at said predetermined low temperature and said measuring junction is exposed to radiation from a source at said higher temperature, and a second temperature sensitive compensating means electrically connected in circuit with said element and said connected portion of said first compensating means between said terminals and responsive to the temperature of said structure, said second compensating means being adapted to introduce between said terminals a second compensating electrical effect dependent upon the temperature of said structure and effectively modifying the sensitivity of said element in accordance with changes in the last mentioned temperature.

4. A radiation pyrometer of the thermoelectric type including a temperature equalizing structure, a thermoelectric element having a measuring junction arranged within said structure to receive radiant heat from a source of such heat, having a reference junction arranged in close thermal contact with said structure, and adapted to produce an electrical effect dependent upon the difference between the temperatures of said junctions, an electrical measuring circuit having a pair of output terminals and including said element between said terminals, a first temperature sensitive compensating means having at least a portion electrically connected in circuit with said element between said terminals and having at least a portion arranged in close thermal contact with said structure and electrically responsive to the temperature thereof, said first compensating means being adapted, in response to change in the temperature of said structure from a predetermined low value to a higher value, to introduce between said terminals in additive relation to said electrical effect a first compensating electrical effect which is dependent upon the temperature of said structure and which is substantially equal to the electrical effect which would be developed by said element when the structure is at said predetermined low temperature and said measuring junction is exposed to radiation from a source at said higher temperature, and a second temperature sensitive compensating means electrically connected in circuit with said element and said connected portion of said first compensating means between said terminals and responsive to the temperature of said structure, said second compensating means being adapted to introduce between said terminals a second compensating electrical effect dependent upon the temperature of said structure and effectively modifying the sensitivity of said element in accordance with changes in the last mentioned temperature.

5. A radiation pyrometer as specified in claim 4, in which said first compensating means comprises a temperature sensitive resistor.

6. A radiation pyrometer as specified in claim 4, in which said first compensating means comprises a thermocouple having a first junction which is, and a second junction which is not, in close thermal contact with said structure, a thermoelement connecting said first and second junctions, a second connection between said first and second junctions comprising a temperature responsive resistor in close thermal contact with said structure and having one end connected to said first junction and to said thermoelectric element, and a conductor connecting the second end of said resistor to said second junction.

7. Radiation pyrometer apparatus comprising a temperature equalizing structure and a measuring circuit including a source of energizing current, a circuit branch connected across said source and including a slidewire resistor, a second circuit branch connected across said source and including in series two resistors, one only of which is a first temperature responsive resistor arranged in close thermal contact with said structure and adapted to produce an electrical compensating effect dependent upon the temperature of said structure, a slider contact engaging and adjustable along said slidewire resistor, a detector circuit branch having one terminal connected to said slider contact and having a second terminal connected to said second circuit branch at a point intermediate the two resistors in said branch, a thermoelectric element having a radiation receiver and one or more reference junctions connected in said detector circuit branch between said terminals and arranged in close thermal contact with said structure, and other temperature compensating means physically and thermally associated with said element and said structure, and responsive to the temperature of said structure, said other compensating means being adapted to modify the sensitivity and thereby the effective electrical effect produced by said element in accordance with changes in the temperature of said structure, and said first temperature responsive resistor being operative in association with said measuring circuit to introduce in said detector circuit branch of said measuring circuit an electromotive force in additive relation to that produced by said element in response to change in the temperature of said temperature equalizing structure from a predetermined low value to a higher value, which is substantially equal to the electromotive force which would be developed by said thermoelectric element when the said temperature equalizing structure is at said predetermined low temperature and said radiation receiver is exposed to radiation from a source at said higher temperature.

8. Radiation pyrometer apparatus comprising a measuring circuit including a source of energizing current, a circuit branch connected across said source and including a slidewire resistor, a second circuit branch connected across said source and including in series two resistors, one only of which is a first temperature responsive resistor, a slider contact engaging and adjustable along said slidewire resistor, a detector circuit branch having one terminal connected to said slider contact and having a second terminal connected to said second circuit branch at a point intermediate the two resistors in said branch, a thermoelectric element having a radiation receiver and one or more reference junctions connected in said detector circuit branch between said terminals, a second temperature responsive resistor connected between said terminals in shunt to said thermoelectric element, temperature equalizing means included in said radiation apparatus and tending to maintain each reference junction of said thermoelectric element and said second temperature responsive resistor at a common temperature, and means adapted to cause said first temperature responsive resistor to introduce in said detector circuit branch, in additive relation with the output electromotive force of said thermoelectric element, a compensating electromotive force, in response to change in the temperature of said temperature equalizing means from a predetermined low value to a higher value, which is substantially equal to the electromotive force which would be developed by said thermoelectric element when the said temperature equalizing means is at said predetermined low temperature and said radiation receiver is exposed to radiation from a source at said higher temperature, said last mentioned means comprising a thermoelement connected between said second terminal and said second branch point, said thermoelement having a first junction and a second junction, said first junction being arranged for maintenance by said temperature equalizing means at said common temperature, and said second junction and first temperature responsive resistor being exposed to the same ambient temperature variable relative to said common temperature.

9. Radiation pyrometer apparatus as specified in claim 8, in which said final means comprises a first thermoelement connected between said second terminal and said second branch point, said thermoelement having a first junction and a second junction, a third temperature responsive resistor, a second thermoelement connected between said first and second junctions in series with said third temperature responsive resistor, said first junction and third temperature responsive resistor being arranged for maintenance by said temperature equalizing means at said common temperature, and said second junction and first temperature responsive resistor being exposed to the same ambient temperature variable relative to said common temperature.

10. A radiation sensitive instrument including a temperature equalizing structure, an electrical effect-producing radiation sensitive element having a part arranged within said structure to receive radiant heat from a source of such heat, having a reference part also arranged in close thermal contact with said structure, and adapted to produce an electrical effect dependent upon the difference between the temperatures of said parts, an electrical measuring circuit having a pair of output terminals and including said element between said terminals, a temperature responsive element electrically connected to said radiation sensitive element, arranged in close thermal contact with said structure, and adapted to vary the output electrical effect of said radiation sensitive element to substantially minimize errors tending to result from variations in the temperature of said reference part, and compensating means having at least a portion electrically connected in circuit with said elements between said terminals and having at least a portion arranged in close thermal contact with said structure and electrically responsive to the temperature thereof, said compensating means being adapted, in response to change in the temperature of said structure from a predetermined low value to a higher value, to introduce between said terminals in additive relation to said electrical effect, as modified by said temperature responsive element, a compensating electrical effect which is dependent upon the temperature of said structure and which is substantially equal to the electrical effect which would be produced jointly by said radiation sensitive element and temperature responsive element when said structure is at said predetermined low temperature and said radiation receiving part is exposed to radiation from a source at said higher temperature, whereby the effective output of said instrument between said terminals is maintained substantially constant notwithstanding normal variations in temperature of said structure.

11. A radiation sensitive instrument including a temperature equalizing structure, an electrical effect-producing radiation sensitive element having a part arranged within said structure to receive radiant heat from a source of such heat, having a reference part arranged in thermal association with said structure, and adapted to produce an electrical effect dependent upon the difference between the temperatures of said parts, an electrical measuring circuit having a pair of output terminals and including said element between said terminals, a temperature responsive element electrically connected to said radiation sensitive element, arranged in close thermal contact with said structure, and adapted to vary the output electrical effect of said radiation sensitive element to substantially minimize errors tending to result from variations in the temperature of said reference part, and compensating means having at least a portion electrically connected in circuit with said elements between said terminals and having at least a portion arranged in close thermal contact with said structure and electrically responsive to the temperature thereof, said compensating means being adapted, in response to change in the temperature of said structure from a predetermined low value to a higher value, to introduce between said terminals in additive relation to said electrical effect, as modified by said temperature responsive element, a compensating electrical effect which is dependent upon the temperature of said structure and which is substantially equal to the electrical effect which would be produced jointly by said radiation sensitive element and temperature responsive element when said structure is at said predetermined low temperature and said radiation receiving part is exposed to radiation from a source at said higher temperature, whereby the effective output of said instrument between said terminals is maintained substantially constant notwithstanding normal variations in temperature of said structure.

12. A radiation pyrometer of the thermoelectric type including a temperature equalizing structure, a thermoelectric element having a measuring junction arranged within said structure to receive radiant heat from a source of such heat, having a reference junction arranged in thermal association with said structure, and adapted to produce an electrical effect dependent upon the difference between the temperatures of said junctions, an electrical measuring circuit having a pair of output terminals and including said element between said terminals, a temperature responsive element electrically connected to said thermoelectric element, arranged in close thermal contact with said structure, and adapted to vary the output electromotive force of said thermoelectric element to substantially minimize errors tending to result from variations in the temperature of said reference junction, and compensating means having at least a portion electrically connected in circuit with said elements between said terminals and having at least a portion arranged in close thermal contact with said structure and electrically responsive to the temperature thereof, said compensating means being adapted, in response to change in the temperature of said structure from a predetermined low value to a higher value, to introduce between said terminals in additive relation to said electrical effect, as modified by said temperature responsive element, a compensating electrical effect which is dependent upon the temperature of said structure and which is substantially equal to the electrical effect which would be produced by said thermoelectric element when said structure is at said predetermined low temperature and said measuring junction is exposed to radiation from a source at said higher temperature.

13. A radiation pyrometer as specified in claim 12, in which said temperature responsive element comprises a resistor having a positive temperature coefficient of resistance and connected in shunt relation with said thermoelectric element.

14. A radiation pyrometer as specified in claim 12, in which said reference junction of said thermoelectric element is arranged in close thermal contact with said structure, and in which said temperature responsive element comprises a resistor having a positive temperature coefficient of resistance and connected in shunt with said thermoelectric element.

15. A radiation pyrometer as specified in claim 12, in which said reference junction of said thermoelectric element is arranged in close thermal contact with said structure, in which said temperature responsive element comprises a temperature responsive resistor connected in shunt with said thermoelectric element, and in which said compensating means comprises a thermocouple having a first junction which is, and a second junction which is not, in close thermal contact with said structure, a thermoelement connecting said first and second junctions, a second connection between said first and second junctions comprising a temperature sensitive resistor in close thermal contact with said structure and having one end connected to said first junction and to said thermoelectric element, and a conductor connecting the second end of the last mentioned temperature sensitive resistor to said second junction.

16. A radiation sensitive instrument including a temperature equalizing structure, an electrical effect-producing radiation sensitive element having a part arranged within said structure to receive radiant heat from a source of such heat, having a reference part arranged in close thermal contact with said structure, and adapted to produce an electromotive force dependent upon the difference between the temperatures of said parts, an electrical measuring circuit having a pair of output terminals and including said element between said terminals, said element tending to impress between said terminals an electromotive force dependent in magnitude upon the fourth power of the temperature of said structure and a sensitivity factor which varies with changes in the temperature of said structure, a first temperature sensitive compensating means having at least a portion electrically connected in circuit with said element between said terminals, having at least a portion arranged in close thermal contact with said structure and electrically responsive to the temperature thereof, and adapted to introduce between said terminals in additive relation to said electromotive force a first compensating electrical effect of a magnitude to free substantially the electromotive force between said terminals from dependence upon said fourth power of the temperature of said structure, and a second temperature sensitive compensating means electrically connected in circuit with said element between said terminals, responsive to the temperature of said structure, and adapted to introduce between said terminals a second compensating electrical effect of a magnitude to free substantially the electromotive force between said terminals from dependence upon the variations in said sensitivity factor produced by variations in the temperature of said structure.

17. A radiation sensitive instrument including a temperature equalizing structure, an electrical effect-producing radiation sensitive element having a part arranged within said structure to receive radiant heat from a source of such heat, having a reference part arranged in close thermal contact with said structure, and adapted to produce an electrical effect dependent upon the difference between the temperatures of said parts, an electrical measuring circuit having a pair of output terminals and including said element between said terminals, a first temperature sensitive compensating means having at least a portion electrically connected in circuit with said element between said terminals and having at least a portion arranged in close thermal contact with said structure and electrically responsive to the temperature thereof, said first compensating means being adapted, in response to change in the temperature of said structure from a predetermined low value to a higher value, to introduce between said terminals in additive relation to said electrical effect a compensating electrical effect which is dependent upon the temperature of said structure and which is substantially equal to the electrical effect which would be produced by said element when said structure is at said predetermined low temperature and said radiation receiving part is exposed to radiation from a source at said higher temperature, and other temperature compensating means physically and thermally associated with said element and said structure, and responsive to the temperature of said structure, said other compensating means being adapted to modify the sensitivity of said element and thereby the effective electrical effect produced by said element in accordance with changes in the temperature of said structure.

18. A radiation sensitive instrument including a temperature equalizing structure, an electrical effect-producing radiation sensitive element having a part arranged within said structure to receive radiant heat from a source of such heat, having a reference part arranged in close thermal contact with said structure, and adapted to produce an electromotive force dependent upon the difference between the temperatures of said parts, an electrical measuring circuit having a pair of output terminals and including said element between said terminals, said element tending to impress between said terminals an electromotive force dependent in magnitude upon the fourth power of the temperature of said structure and a sensitivity factor which varies with changes in the temperature of said structure, a first temperature sensitive compensating means having at least a portion electrically connected in circuit with said element between said terminals, having at least a portion arranged in close thermal contact with said structure and electrically responsive to the temperature thereof, and adapted to introduce between said terminals in additive relation to said electromotive force a compensating electrical effect of a magnitude to free substantially the electromotive force between said terminals from dependence upon said fourth power of the temperature of said structure, and other temperature compensating means physically and thermally associated with said element and said structure, and responsive to the temperature of said structure, said other compensating means being adapted to modify the sensitivity of said element and thereby the effective electrical effect produced by said element in accordance with changes in the temperature of said structure, thereby to free substantially the electromotive force between said terminals from dependence upon the variations in said sensitivity factor produced by variations in the temperature of said structure.

References Cited in the file of this patent

UNITED STATES PATENTS

| Number | Name | Date |
|---|---|---|
| 2,250,712 | Johnson | July 29, 1941 |
| 2,357,193 | Harrison | Aug. 29, 1944 |
| 2,509,048 | Vogelsang | May 23, 1950 |

FOREIGN PATENTS

| Number | Country | Date |
|---|---|---|
| 766,531 | France | Apr. 16, 1934 |
| 640,711 | Great Britain | July 26, 1950 |